US009435243B2

(12) United States Patent
Knittel et al.

(10) Patent No.: US 9,435,243 B2
(45) Date of Patent: Sep. 6, 2016

(54) METERING MODULE FEATURING AIR GAP INSULATION

(71) Applicant: Robert Bosch GmbH, Stuttgart (DE)

(72) Inventors: Achim Knittel, Ditzingen (DE); Stephan Pohl, Schwieberdingen (DE); Martin Kiontke, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 93 days.

(21) Appl. No.: 14/359,962

(22) PCT Filed: Nov. 19, 2012

(86) PCT No.: PCT/EP2012/072949
§ 371 (c)(1),
(2) Date: May 22, 2014

(87) PCT Pub. No.: WO2013/076028
PCT Pub. Date: May 30, 2013

(65) Prior Publication Data
US 2014/0305104 A1 Oct. 16, 2014

(30) Foreign Application Priority Data
Nov. 22, 2011 (DE) .................. 10 2011 086 798

(51) Int. Cl.
F01N 3/20 (2006.01)
F01N 11/00 (2006.01)
B05B 9/00 (2006.01)

(52) U.S. Cl.
CPC ............. F01N 3/208 (2013.01); F01N 3/2066 (2013.01); F01N 11/00 (2013.01); B05B 9/002 (2013.01);
(Continued)

(58) Field of Classification Search
CPC ......... B05B 1/24; B05B 9/002; F01N 3/208; F01N 3/2066; F01N 11/00; F01N 2260/024; F01N 2610/02; F01N 2610/11; F01N 2610/1453
USPC .................. 239/125, 130, 132, 132.1, 132.3; 60/286, 295, 298, 303
See application file for complete search history.

(56) References Cited

U.S. PATENT DOCUMENTS

| 5,605,042 A | 2/1997 | Stutzenberger |
| 7,603,849 B2 * | 10/2009 | Hanitzsch ............. F01N 3/2066 239/128 |
| 8,047,452 B2 * | 11/2011 | Martin .................. F01N 3/2066 239/132 |

(Continued)

FOREIGN PATENT DOCUMENTS

| CN | 1651728 A | 8/2005 |
| CN | 101688453 A | 3/2010 |

(Continued)

OTHER PUBLICATIONS

International Search Report for Application No. PCT/EP2012/072949 dated Jan. 25, 2013 (English Translation, 2 pages).

Primary Examiner — Len Tran
Assistant Examiner — Cody Lieuwen
(74) Attorney, Agent, or Firm — Michael Best & Friedrich LLP

(57) ABSTRACT

The invention relates to a device for cooling a metering module (10), in particular a module for metering an operating agent/auxiliary agent such as a reducing agent into the exhaust gas system of an internal combustion engine. A cooling device comprising a cooling member (17, 20, 24, 28, 29) through which a cooling liquid flows is associated with the metering module (10). The cooling member (17, 20, 24, 28, 29) acts as a housing (12) for the metering module (10). A first group of parts (17, 20, 28) forms an air gap insulation (38; 54, 56, 58) on an electric contact (16, 36), while cooling fluid flows through a second group of parts (28, 29, 40).

20 Claims, 3 Drawing Sheets

(52) U.S. Cl.
CPC ...... *F01N 2260/024* (2013.01); *F01N 2610/02* (2013.01); *F01N 2610/11* (2013.01); *F01N 2610/1453* (2013.01); *Y02T 10/24* (2013.01)

(56) References Cited

U.S. PATENT DOCUMENTS

| | | | |
|---|---|---|---|
| 2003/0230646 A1* | 12/2003 | Edgar | B01D 53/8625 239/553.2 |
| 2007/0290070 A1* | 12/2007 | Hornby | F01N 3/035 239/132.3 |
| 2008/0014103 A1* | 1/2008 | Cooke | F01N 3/2066 417/410.1 |
| 2008/0236147 A1 | 10/2008 | Van Vuuren et al. | |
| 2010/0108020 A1 | 5/2010 | Miretti | |
| 2011/0147393 A1 | 6/2011 | Van Hooren et al. | |

FOREIGN PATENT DOCUMENTS

| | | | |
|---|---|---|---|
| DE | 102009047375 | 6/2011 | |
| DE | 102010051656 A1 * | 5/2012 | ........... F02M 53/043 |
| EP | 2503122 A1 * | 9/2012 | ........... F01N 3/2066 |
| JP | 9096212 | 4/1997 | |
| JP | 2006226162 | 8/2006 | |
| JP | 2010031769 | 2/2010 | |
| JP | 2013519822 | 5/2013 | |
| WO | 2013068288 A1 | 5/2013 | |

* cited by examiner

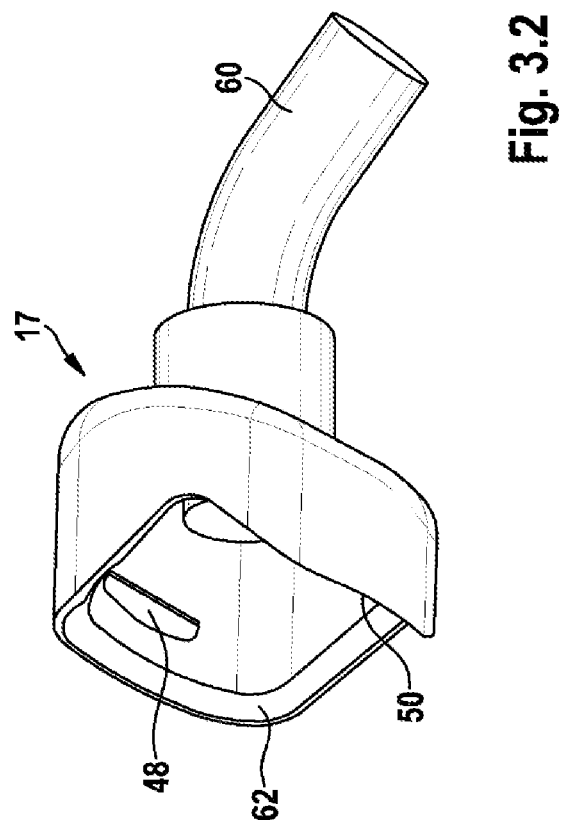
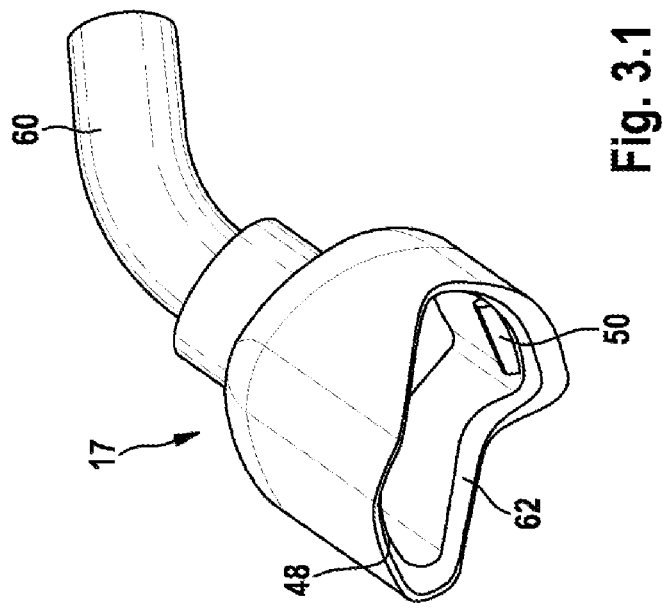

METERING MODULE FEATURING AIR GAP INSULATION

BACKGROUND OF THE INVENTION

DE 44 36 397 B4 relates to a device for the aftertreatment of exhaust gases. The device comprises an exhaust gas collecting system, in which a reduction catalytic converter for reducing the levels of $NO_x$ constituents in the exhaust gas of the internal combustion engine is arranged. The device furthermore comprises a metering device, comprising an electrically controlled metering valve for the metered introduction of a reducing agent into the flow of exhaust gas supplied to the catalytic converter, depending on a value, which is stored in the map, for the $NO_x$ content in the exhaust gas at various operating parameters of the internal combustion engine and of the catalytic converter. The valve for controlling the supply of air is an electrically controlled control valve which is arranged downstream of the outlet opening of the metering valve and the outlet opening thereof leads directly into the exhaust gas flow of the internal combustion engine. The control valve is accommodated by a body through which a cooling medium can flow such that the control valve is cooled.

US 2008 0236147 A1 discloses an injection system which is used within the scope of selective catalytic reduction in a motor vehicle in order to reduce the levels of $NO_x$ portions in the exhaust gas. According to this solution, the injection system comprises an injector which is supplied with current via an electric terminal. The electric terminal contains an electric contact which is configured for receiving a plug of a connecting line.

US 2010 0108020 A1 relates to a connecting system for electric lines which are laid in hazardous areas, for example, an area in which there is a risk of explosion, such as, for example, the environment of an internal combustion engine. The disclosed connecting system is suitable for the electric connection of lines of various sensors and components. The connecting system comprises a rubber bush and a cap provided with an internal thread. The rubber bush here serves as an electric and thermal insulator and is compressed in the fitted state of the connecting system.

DE 10 2009 060 065 A1 discloses a fluid line for urea-water solutions in $NO_x$ reduction devices which operate in accordance with selective catalytic reduction (SCR). The fluid line is produced from a thermoplastic vulcanizate (TPV). The thermoplastic vulcanizate has rubber-like properties and is also known under the designation "thermoplastic elastomer". The thermoplastic vulcanizate is distinguished in particular by high resistance to aggressive liquids and has a very high degree of flexibility and excellent pliability. According to DE 10 2009 060 065 A1, a fluid line manufactured from thermoplastic vulcanizate is used for connecting tanks, pumps, injection nozzles or for receiving couplings.

SUMMARY OF THE INVENTION

The invention is based on the object of providing a metering module for an exhaust gas aftertreatment system, said metering module withstanding high thermal loadings which occur during the operation of an internal combustion engine.

According to the invention, it is proposed, in a metering module, in order to protect the latter from overheating, to surround a wall of said component with an insulation shell and/or to implement water cooling. When an insulation shell is used, it is possible, for example to realize an air gap insulation which provides protection from overheating damage in particular in the plug region or in the region of the valve coil.

Following the solution proposed according to the invention, the metering element is enclosed by a heat sink which, comprising a plurality of parts, completely encloses the metering valve for introducing a fuel/additive, in particular a reducing agent, into the exhaust section of an internal combustion engine. According thereto, the heat sink constitutes a housing of the metering element. In a preferred variant embodiment of the solution proposed according to the invention, the heat sink constituting the housing of the metering valve is of multi-part design and comprises, for example, an upper shell, a central shell and a plug-in contact cover which is manufactured from a material having elastic properties, and is designed, for example, as a plastics bush or rubber bush. Furthermore, the housing of the metering module comprises a lower shell which is located below the central shell, wherein a cup-shaped insert is embedded in the lower shell of the heat sink constituting the housing of the metering module.

Whereas the upper shell of the heat sink, which is in particular of multi-part design, comprises a reducing agent inlet and also cavities through which a cooling fluid does not flow, but which constitute air gap insulation means, the central shell arranged below the upper shell comprises cavities through which the cooling fluid flows and cavities which are merely filled with air and therefore constitute air gap portions of an air gap insulation of an electric plug-in contact.

The lower shell, which accommodates the cup-shaped insert, is provided with a cavity through which cooling fluid flows. The circulation of the cooling fluid in the cup-shaped insert of the lower shell or through those parts of the central shell through which cooling liquid flows takes place through a cooling fluid inlet, which is accommodated on the lower shell, and via a cooling fluid return located on the circumferential surface of the central shell. Passage openings which permit cooling fluid to flow from the cavity of the lower shell into the cavity of the upper shell are located between the cup-shaped insert, which is accommodated in the lower shell, and the base of the central shell arranged above said lower shell.

Following the solution proposed according to the invention, the central shell constitutes to a certain extent a "hybrid component" which firstly permits air gap insulation with respect to the electric plug-in contact connection running through said central shell, but secondly has regions through which the cooling fluid flows. In the manner proposed according to the invention, the regions which conduct the cooling fluid are separated from the regions which constitute the air gap insulation of the electric content, wherein the number of required sealing points is reduced to a minimum. In order to separate the air gap portions constituting the air gap insulation in the central shell from the cavities which are formed in the central shell and conduct the cooling fluid, mention should advantageously be made of a separating rib which runs at an inclination through the central shell and separates the air gap portions of the air gap insulation from that cavity of the central shell which conducts the cooling fluid.

Following the solution proposed according to the invention, not only can the region of the metering module that lies in the region of an outlet opening of the fuel/additive, in particular of the reducing agent, be cooled with a cooling fluid, but further regions of the metering module can be cooled, this being achieved with the aid of the air gap insulation. In a particularly advantageous manner, the air gap insulation of the electric contact for activating the metering module can take place in the region, in particular in the central shell of the multi-part heat sink constituting a housing of the metering valve, since the electric contact connection is enclosed by a plastics cover which is manufactured from a material which has elastic properties. Owing to the elastic properties of the plastics cover, different coefficients of expansion of regions of the heat sink manufactured from metallic material and of parts of the heat sink manufactured from plastics material can be compensated for. The plug-in contact cover, which is designed, for example, as a plastics bush or rubber bush, can be fastened releasably to the upper shell by means of a latching closure and to the central shell in a latching means formed opposite on said component. By means of the plastics cover which can be fastened releasably to the upper shell and to the central shell of the multi-part heat sink constituting the housing, the air gap insulation can be effectively closed, but, at the same time, by omission of a welded joint, relative movements can be permitted without losses of sealing effect.

The solution proposed according to the invention takes simplifications in terms of assembly into consideration by virtue of the fact that the cooling is brought about in the upper region by convection, i.e. in the path of the air gap insulation, whereas liquid cooling can be implemented in the lower region of the metering module such that, following the solution proposed according to the invention, the entire cooling of the metering module can be achieved.

In addition, by the use of the water-cooled central shell, the thermal mass, this means the heat storage capacity, in the upper region of the metering module is increased. As a result, retarded heating of the valve can be achieved even if the cooling fluid circulation is interrupted. Therefore, even without active cooling fluid circulation, temporary temperature peaks do not result in damage of the metering module.

Furthermore, the metering module housing proposed according to the invention constitutes a means of protecting the metering valve from thermal shock in the event of abrupt cooling. Such cooling may occur, for example, when cleaning an engine when the engine is hot or when passing through water. A thermal shock is avoided since the heat sink with the large thermal mass thereof is cooled first. The metering valve enclosed by the heat sink is cooled more slowly as a result, and therefore stresses in the component due to different coefficients of thermal expansion are avoided.

BRIEF DESCRIPTION OF THE DRAWINGS

The invention is described in more detail below with reference to the drawing, in which.

DETAILED DESCRIPTION

The metering module described below with reference to FIGS. 1 to 3.2 is a metering module for introducing a fuel/additive, in particular a reducing agent, such as, for example, urea or a urea-water solution, into the exhaust section of an internal combustion engine. Temperatures in the range between 100° C. and 160° C. prevail in the environment in which the metering module 10 proposed according to the invention is installed. Higher or lower temperature levels may also be present depending on the intended purpose and installation location. By means of the fuel/additive, in particular a reducing agent, such as, for example, urea or a urea-water solution, the $NO_x$ constituents which are present in the exhaust gas of internal combustion engines are reduced to $H_2O$ and $N_2$. The apparatus proposed according to the invention for cooling a metering module 10 can also be used in other metering apparatuses, which are to be operated within a certain temperature range, as a cooling means therefor.

Figure 1:
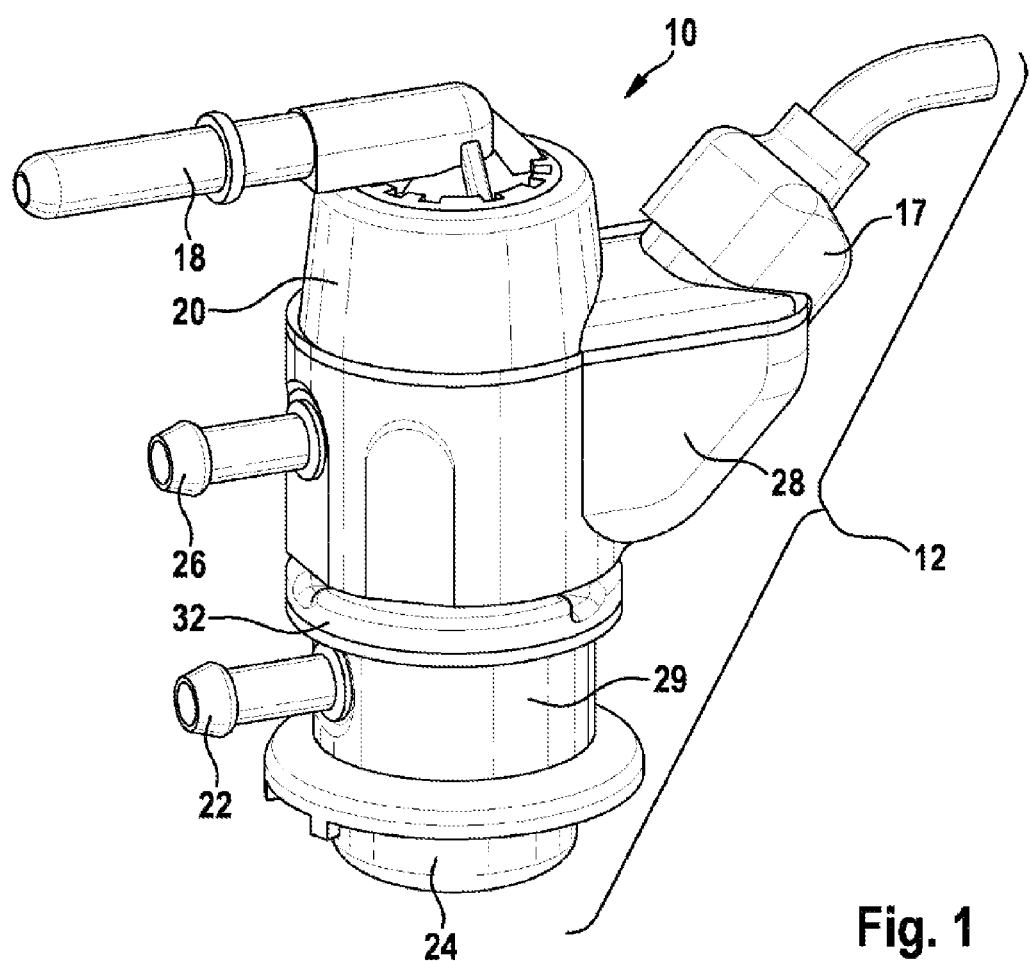
FIG. 1 shows a perspective reproduction of the metering module, the metering valve of which is enclosed by a multi-part heat sink constituting a housing.

It can be gathered from the illustration according to FIG. 1 that a metering valve of a metering module 10 is enclosed by a complete housing 12 which to a certain extent constitutes a second housing. The complete housing 12 comprises an upper shell 20, which can be designed, for example, in the form of a cap, and a plastics covering 17 which can be manufactured in particular from a material having elastic properties, such as, for example, a plastics material or a rubber. Furthermore, the housing 12 comprises a central shell 28, and also a guide sleeve 32 arranged below the latter and a lower shell 29 which lies below said guide sleeve and into which a cup-shaped insert 24—only partially illustrated in FIG. 1—is embedded.

As emerges from the perspective illustration according to FIG. 1, the metering valve of the metering module 10 is entirely enclosed by the components 17, 20, 28, 29 listed above. Only a lower end of the cup-shaped insert 24 protrudes below the lower shell 29 of the complete housing 12 of the metering module 10.

As furthermore emerges from the perspective illustration according to FIG. 1, a cooling fluid inlet 22 is located in the circumferential surface of the lower shell 29. By contrast, a cooling fluid return 26 is located in the circumferential surface of the central shell 28.

Figure 2:
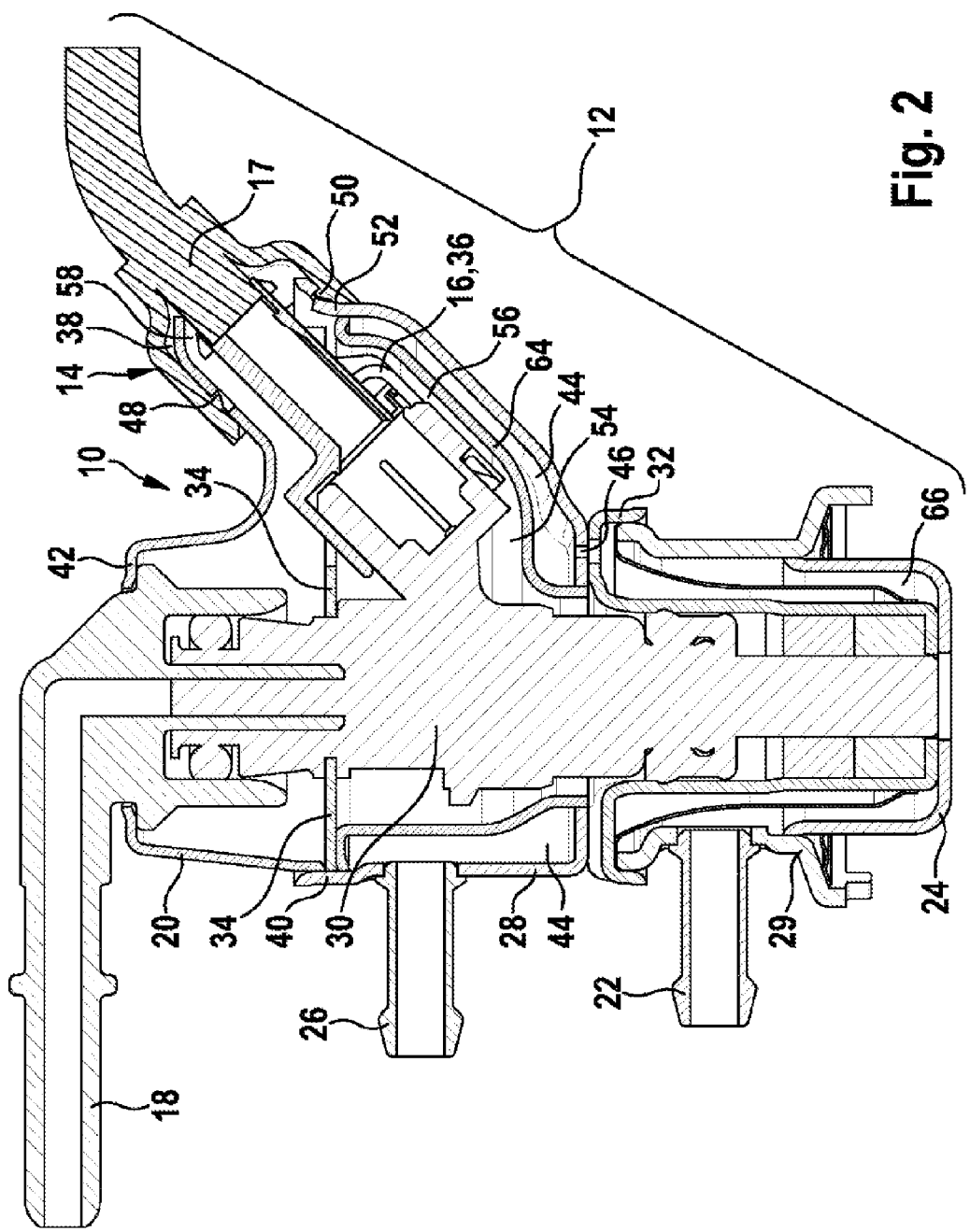
FIG. 2 shows a cross section through the metering module illustrated in FIG. 1 and through the multi-part heat sink thereof, and FIGS. 3.1 and 3.2 show perspective views of the plug-in contact cover.

A section through the multi-part embodiment of the heat sink of the metering module according to FIG. 1 can be gathered from the illustration according to FIG. 2.

The cross section according to FIG. 2 shows that the entire metering valve 30 is surrounded by the complete housing 12. The complete housing 12 here includes the upper shell 20. The fuel/additive inlet 18, via which in particular a reducing agent, such as, for example, urea or a urea-water solution, is supplied to the metering module 10, extends through the upper shell 20. FIG. 2 shows that said inlet 18 is of angled design and is encapsulated by the upper shell 20 by a flange covering an upper end side of the metering valve 30. The upper shell 20, for its part, comprises a cavity 42 which is separated from the cooling fluid by a separating rib 64, which is denoted by reference number 64, in relation to the central shell 28, the cavity 44 of which has a cooling fluid flowing therethrough. As can furthermore be gathered from the sectional illustration according to FIG. 2, the upper shell 20 in the region of a plug 16 or an electric plug-in contact 36 comprises an air gap portion 58 which is part of an air gap insulation 14 of the electric plug-in contact 16 or 36 of the metering module 10.

A central shell which is identified by reference number 28 is located below the upper shell 20, which is part of the complete housing 12 of the metering module. The central shell 28 comprises a receptacle 40 in which the upper shell 20 including the cavity 42 through which cooling fluid does not flow is embedded.

The central shell 28 likewise surrounds the metering valve 30 which is accommodated on the central shell 28 via a holding disk 34. The central shell 28 sits on a guide sleeve 32. The guide sleeve 32, for its part, is accommodated on an insert 24 which is of substantially cup-shaped design.

It can be seen from the sectional illustration according to FIG. 2 that the central shell 28 comprises the cavity 44 through which the cooling fluid flows, and at the same time also contains a first air gap portion 54 and a second air gap portion 56. The first air gap portion 54 and the second air gap portion 56 are separated from the cavity 44 by a separating rib 64 which is formed in the central shell 28. In particular, the profile of the separating rib 64 in the central shell 28 is selected in such a manner that the first air gap portion 54 and the adjoining, second air gap portion 56 extend along the electric plug-in contact 36 in the direction of the plug-in contact cover 17. The separating rib 64 which separates the first air gap portion 54 and the second air gap portion 56 from the cavity 44 through which the cooling fluid flows opens out at a wall end 52 of the central shell 28. A latching connection 50 is also located there in the same manner as on the opposite side of the upper shell, compare position 48 in FIG. 2. The plastics covering is latched releasably at the two latching points 48 and 50 which are formed on the upper shell 20 and on the central shell 28. As already explained in conjunction with FIG. 1, the plastics covering 17 is fastened by a latching means 58 to the upper shell 20 and by a latching means 50 opposite the first latching means to the outer side of the central shell 28. Owing to the geometry of the plug covering 17, the latching connections 50 and 52 bounding the opening 62 in the latter extend over the corresponding receiving regions of the upper shell 20 and of the central shell 28 in such a manner that extensions caused by temperature differences can be compensated for on account of the elastic properties of the material of the plug covering 17. This makes it possible to avoid leakages which arise, for example, whenever materials which have different coefficients of thermal expansion, compensate for different extensions occurring during relative movements of the parts with respect to one another.

The solution proposed according to the invention firstly prevents leakage of cooling fluid to the outside and secondly ensures that the cooling fluid is kept away from the electric plug-in contact connection 36 such that no electric short circuit can occur in this region. In the region of the electric contact connection 36, the cooling is realized in the manner proposed according to the invention by the air gap insulation 14 at the air gap portions 38, 54 and 56, as illustrated in FIG. 2.

It emerges from the illustration according to FIG. 2 that the central shell 28 constitutes a "hybrid component" which realizes an air gap insulation in the region of the electric plug-in contact 36 and also has at least one cavity 44 through which cooling fluid flows.

As can be gathered from the lower region of the illustration according to FIG. 2, the lower shell 29 is located below the guide sleeve 32. The lower shell 29, for its part, accommodates the cup-shaped insert denoted by reference number 24.

At the lower end of the metering module 10, temperatures of the order of magnitude of 120° C. and more can occur. For this reason, the cooling fluid inlet 22 into which the cooling fluid flows into the lower shell 29 and from there into a cavity 66 of the cup-shaped insert 24 is located in the region of the lower shell 29. The lower region of the metering valve 30 also contains the injection nozzle via which a spray mist of fuel/additive and air is injected into the exhaust section of the internal combustion engine.

Since the highest temperatures are operationally induced here, in order to optimize the cooling effect the cooling fluid inlet 22 is located in this part of the metering module 10 proposed according to the invention so as to ensure an optimum removal of heat in the range of the high temperatures occurring there.

It furthermore emerges from the sectional illustration according to FIG. 2 that, after the cooling fluid enters through the cooling fluid inlet 22 after flowing through the cavity 66 of the cup-shaped insert 24, the cooling fluid flows via passage openings 46 to the cavity 44 above the base of the central shell 28. As FIG. 2 shows, passage openings 46 in the guide sleeve 32 and in the base of the central shell 28 are aligned with one another such that the cooling fluid, after flowing through the cup-shaped insert 24, passes into the cavity 44 of the central shell 28. After passage through the cavity 44 of the central shell 28, which cavity is separated in a liquid-tight manner from the air gap portions 54, 56 by the separating rib 64, the cooling fluid heated by the waste heat in the metering module 10 after flowing around the latter leaves the cavity 44 of the central shell 28 at the cooling fluid return 26, as illustrated in FIG. 2.

The passage openings 46 ensure that the cooling fluid passes from the cavity 66 of the cup-shaped insert 24 into the at least one cavity 44 of the central shell 28 of the housing 2. As can be gathered from the fitted state according to FIG. 2, the plug cover 17 which is preferably manufactured from material having elastic properties permits the production of air gap insulation, i.e. cooling on account of convection in the region of the electric plug-in contact connection 36 in the upper part of the metering module 10. There is also the possibility of providing water cooling at further components, in particular at the injection part of the metering valve 30 that is exposed to high thermal loadings, said water cooling making it possible for heat to be very reliably transported away. The solution proposed according to the invention realizes the cooling of all of the components of a metering module 10. By means of the solution proposed according to the invention, materials optimized in each case with regard to the intended purpose thereof can in particular be used without the possibly different coefficients of thermal expansion thereof resulting in leakages or fatigue cracks.

Perspective views of the plug cover as illustrated in cross section in FIG. 1 and FIG. 2 can be gathered from FIGS. 3.1 and 3.2.

FIG. 3.1 shows that the plug cover 17 encloses a cable outlet 60 and has an opening 62. The opening 62 is bounded by latching means 48, 50 which are formed opposite each other and can be formed as depressions or elevations, designed in a complementary manner with respect to the geometry thereof, on the upper shell 20 or in the plug region of the central shell 28. FIG. 3.2 shows that the opening 62 in the plastics cover 17 can be, for example, of square or else rectangular design, which is favorable in respect of the formation of the latching connections 48, 50. If the latter are opposite each other, when the plug cover 17 is latched and a prestress is produced, a reliably sealing, but also re-releasable fastening of the plastics cover 17 to the upper shell 20 and central shell 28 of the heat sink which constitutes the housing 12 and is of multi-part design can be achieved.

The invention claimed is:

1. An apparatus for cooling a metering module (10), the apparatus comprising a metering valve (30), wherein the metering module (10) is assigned a cooling device which comprises a heat sink (17, 20, 24, 28, 29) through which a cooling fluid flows, wherein the heat sink (17, 20, 24, 28, 29) forms a housing (12) of the metering valve (30), wherein a first group of parts (17, 20, 28) of the housing forms an air gap insulation (38; 54, 56, 58) at least partially surrounding an electric contact (16, 56) and a second group of parts (28, 29, 40, 64) of the housing defines a cavity (44), the cavity (44) having the cooling fluid flowing therethrough, wherein the cavity (44) at least partially surrounds the air gap insulation (38; 54, 56, 58), wherein the cavity (44) and the air gap insulation (38; 54, 56, 58) share a common wall (64), wherein the air gap insulation (38; 54, 56, 58) is arranged on an interior of the common wall (64), wherein the cavity (44) is arranged on an exterior of the common wall (64), and wherein the heat sink comprises an upper shell (20), a latchable plug-in contact cover (17), a central shell (28), a lower shell (29), and a cup-shaped insert (24) embedded in the lower shell (29).

2. The apparatus as claimed in claim 1, characterized in that the upper shell (20) is separated in a media-tight manner from the central shell (28) through which cooling fluid flows at least in some regions.

3. The apparatus as claimed in claim 1, characterized in that the central shell (28) has the cavity (44) which conducts cooling fluid, and in that the upper shell (20) forms an air gap portion (58) of the air gap insulation (14) together with the latchable plug-in contact cover (17).

4. The apparatus as claimed in claim 1, characterized in that the central shell (28) has the cavity (44) through which cooling fluid flows, and comprises first and second air gap portions (54, 56) of the air gap insulation (38), said air gap portions being separated from said cavity (44).

5. The apparatus as claimed in claim 4, characterized in that the central shell (28) comprises a cooling fluid return (26) emerging from the cavity (44).

6. The apparatus as claimed in claim 4, wherein the central shell (28) contains the common wall (64), and wherein the common wall (64) separates the cavity (44) from the first and second air gap sections (54, 56).

7. The apparatus as claimed in claim 1, characterized in that a guide sleeve (32) is accommodated between the central shell (28) and the cup-shaped insert (24) embedded in the lower shell (29).

8. The apparatus as claimed in claim 1, characterized in that a cooling fluid inlet (22) leads into the lower shell (29) which contains a lower shell cavity (66) conducting cooling fluid.

9. The apparatus as claimed in claim 8, characterized in that passage openings (46) which permit cooling fluid to flow from the lower shell cavity (66) of the cup-shaped insert (24) into the cavity (44) of the central shell (28) are provided in a guide sleeve (32) and in a base of the central shell (28).

10. The apparatus as claimed in claim 1, characterized in that the plug cover (17) is manufactured from material having elastic properties in order to compensate for temperature-induced expansions of upper shell (20) and central shell (28).

11. The apparatus as claimed in claim 10, characterized in that the plug cover (17) comprises a first latching means (48) on the upper shell (20) and a further, second latching means (50) on the central shell (28) of the heat sink (17, 20, 24, 28, 29).

12. The apparatus as claimed in claim 1, wherein the first group of parts includes the latchable plug-in contact (17), and wherein the latchable plug-in contact surrounds at least part of the air gap insulation (38, 54, 56, 58).

13. The apparatus as claimed in claim 1, wherein the first group of parts includes the latchable plug-in contact (17), the upper shell (20), and the central shell (28).

14. The apparatus as claimed in claim 13, wherein the second group of parts includes the central shell (28), the lower shell (29), and a receptacle (40).

15. The apparatus as claimed in claim 14, wherein the central shell (28) has the cavity (44) through which cooling fluid flows, and wherein the central shell (28) includes first and second air gap portions (54, 56) of the air gap insulation (38), the first and second air gap portions (54, 56) being separated from the cavity (44) by the common wall (64).

16. The apparatus as claimed in claim 15, wherein the first and second air gap portions (54, 56) separate the cavity (44) from the electric contact (16, 56).

17. The apparatus as claimed in claim 1, wherein the second group of parts includes the central shell (28), the lower shell (29), and a receptacle (40), wherein the central shell (28) has the cavity (44) through which cooling fluid flows, wherein the central shell (28) includes first and second air gap portions (54, 56) of the air gap insulation (38), the first and second air gap portions (54, 56) being separated from the cavity (44) by the common wall (64), and wherein the first and second air gap portions (54, 56) separate the cavity (44) from the electric contact (16, 56).

18. An apparatus for cooling a metering module (10), the apparatus comprising a metering valve (30), wherein the metering module (10) is assigned a cooling device which comprises a heat sink (17, 20, 24, 28, 29) through which a cooling fluid flows, wherein the heat sink (17, 20, 24, 28, 29) forms a housing (12) of the metering valve (30), wherein a first group of parts (17, 20, 28) of the housing forms an air gap insulation (38; 54, 56, 58) on an electric contact (16, 56) and a second group of parts (28, 29, 40, 64) of the housing has the cooling fluid flowing therethrough, wherein the heat sink comprises an upper shell (20), a latchable plug-in contact cover (17), a central shell (28), a lower shell (29) and a cup-shaped insert (24) embedded in the lower shell (29), wherein a cooling fluid inlet (22) leads into the lower shell (29) which contains a lower shell cavity (66) conducting cooling fluid, and wherein passage openings (46) which permit cooling fluid to flow from the lower shell cavity (66) of the cup-shaped insert (24) into a cavity (44) of the central shell (28) are provided in a guide sleeve (32) and in a base of the central shell (28).

19. The apparatus as claimed in claim 18, wherein the central shell (28) has the cavity (44) through which cooling fluid flows, and includes first and second air gap portions (54, 56) of the air gap insulation (38), said air gap portions (54, 56) being separated from said cavity (44).

20. The apparatus as claimed in claim 19, wherein the cavity (44) and the air gap insulation (38; 54, 56, 58) share a common wall (64), wherein the air gap insulation (38; 54, 56, 58) is arranged on an interior of the common wall (64), wherein the cavity (44) is arranged on an exterior of the common wall (64), and wherein the central shell (28) contains the common wall (64) which separates the cavity (44) from the first and second air gap sections (54, 56).

* * * * *